United States Patent
Lee

(10) Patent No.: US 11,022,435 B2
(45) Date of Patent: Jun. 1, 2021

(54) PATTERN PROJECTION DEPTH VALUE 3D SCANNING DEVICE AND METHOD

(71) Applicant: KALLION, INC., Daejeon (KR)

(72) Inventor: Chul Hee Lee, Daejeon (KR)

(73) Assignee: KALLION, INC., Daejeon (KR)

( * ) Notice: Subject to any disclaimer, the term of this patent is extended or adjusted under 35 U.S.C. 154(b) by 0 days.

(21) Appl. No.: 16/300,979

(22) PCT Filed: Apr. 5, 2017

(86) PCT No.: PCT/KR2017/003713
§ 371 (c)(1),
(2) Date: Nov. 13, 2018

(87) PCT Pub. No.: WO2017/195984
PCT Pub. Date: Nov. 16, 2017

(65) Prior Publication Data
US 2019/0162529 A1    May 30, 2019

(30) Foreign Application Priority Data
May 13, 2016 (KR) .................. 10-2016-0059033

(51) Int. Cl.
*G01B 11/25* (2006.01)
*G06T 7/593* (2017.01)
(Continued)

(52) U.S. Cl.
CPC .......... *G01B 11/2518* (2013.01); *G01B 11/25* (2013.01); *G01B 11/2513* (2013.01);
(Continued)

(58) Field of Classification Search
CPC .......... G06T 7/50; G06T 7/507; G06T 7/529; G06T 7/536; G06T 7/55; G06T 7/557;
(Continued)

(56) References Cited

U.S. PATENT DOCUMENTS 9,554,057 B2 * 1/2017 Appia .................. H04N 5/2355
9,912,862 B2 * 3/2018 Peruch ................. H04N 13/189
(Continued)

FOREIGN PATENT DOCUMENTS

DE    102011118349 A1 *  5/2013   ............. G01B 11/25
EP         2573510 A1 *  3/2013   ............... H04N 7/18
(Continued)

OTHER PUBLICATIONS

International Patent Application No. PCT/KR2017/003713 International Search Report, English Translation dated Jul. 3, 2017, 2 pages.

*Primary Examiner* — Gordon J Stock, Jr.
(74) *Attorney, Agent, or Firm* — Leber IP Law; David C. Robertson

(57) ABSTRACT

Disclosed are a 3D scanning apparatus and a 3D scanning method. The 3D scanning apparatus includes a projector projecting patterns previously set onto a subject that is to be 3D scanned, a photographing unit photographing each of the patterns projected onto the subject at each of exposure levels previously set, a calculating unit calculating a depth value for each pixel of the subject based on the patterns photographed at each of the exposure levels, and a scanning unit 3D scanning the subject, which is photographed, based on the calculated depth value. The calculating unit calculates the depth value for each pixel of the subject by calculating the depth value for each pixel of the subject at each of the exposure levels and combining the depth values for the pixel, which are calculated at each of the exposure levels.

8 Claims, 7 Drawing Sheets

(51) Int. Cl.
*H04N 1/00* (2006.01)
*G06T 7/521* (2017.01)
*G06T 7/55* (2017.01)

(52) U.S. Cl.
CPC ............... *G06T 7/521* (2017.01); *G06T 7/55* (2017.01); *G06T 7/593* (2017.01); *H04N 1/00* (2013.01)

(58) Field of Classification Search
CPC ......... G06T 7/564; G06T 7/571; G06T 7/579; G06T 7/586; G06T 7/593; G06T 7/596; G06T 7/97; G06T 7/521; G01S 17/00; G01S 17/02; G01S 17/06; G01S 17/08; G01S 17/42; G01S 17/46; H04N 1/00; H04N 1/00002; H04N 1/00018; H04N 1/00026; H04N 1/00029; H04N 1/00031; H04N 1/00034; H04N 1/00037; G01B 11/002; G01B 11/22; G01B 11/24; G01B 11/25; G01B 11/2513; G01B 11/2418; G01B 11/254; G01B 11/30; G01B 11/303; G01B 11/2518
See application file for complete search history.

(56) References Cited

U.S. PATENT DOCUMENTS

| | | | | |
|---|---|---|---|---|
| 10,302,745 B2 * | 5/2019 | Stigwall | ................. | G01B 11/25 |
| 10,378,886 B2 * | 8/2019 | Nakajima | ................ | G06T 7/521 |
| 10,453,185 B2 * | 10/2019 | Dal Mutto | ........... | H04N 13/254 |
| 10,708,514 B2 * | 7/2020 | Haltmaier | ............. | G01S 17/894 |
| 2005/0007487 A1 * | 1/2005 | Miyoshi | ................. | G01B 11/25 348/362 |
| 2014/0160243 A1 * | 6/2014 | Tsuyuki | ............... | G01B 11/254 348/46 |
| 2015/0116582 A1 * | 4/2015 | Yoshikawa | .......... | H04N 5/2353 348/362 |
| 2016/0373628 A1 * | 12/2016 | Nakajima | ................ | H04N 5/21 |
| 2017/0034499 A1 * | 2/2017 | Doron | .................... | H04N 13/25 |
| 2017/0278260 A1 * | 9/2017 | Matsui | ...................... | G06T 5/50 |
| 2017/0287157 A1 * | 10/2017 | Seto | .................. | G01B 11/2513 |
| 2017/0289515 A1 * | 10/2017 | Li | ......................... | H04N 13/156 |
| 2018/0180407 A1 * | 6/2018 | Inukai | .................... | G06T 7/521 |
| 2019/0170508 A1 * | 6/2019 | Lee | .................... | G01B 11/2518 |

FOREIGN PATENT DOCUMENTS

| | | | | |
|---|---|---|---|---|
| JP | 2007271530 A | * | 10/2007 | ............. G01B 11/25 |
| JP | 2012042332 | | 3/2012 | |
| JP | 2017-3469 A | * | 1/2017 | ............. G01B 11/25 |
| JP | 2017181298 A | * | 10/2017 | ......... G01B 11/2509 |
| KR | 102011004622 | | 5/2011 | |
| KR | 101359099 | | 2/2014 | |
| KR | 1020140019765 | | 2/2014 | |
| KR | 102014005325 | | 5/2014 | |
| WO | WO-2016118310 A1 | * | 7/2016 | ............. G01S 17/46 |

* cited by examiner

PATTERN PROJECTION DEPTH VALUE 3D SCANNING DEVICE AND METHOD

TECHNICAL FIELD

Embodiments of the inventive concepts described herein relate to a three-dimensional (3D) scanning technology, and more particularly, relate to an apparatus and a method, which are capable of scanning a photographed subject in 3D based on depth values codes that are substantially such as patterns projected onto the subject.

BACKGROUND ART

A three-dimensional (3D) scanning apparatus is used in a wide range of fields, such as business, construction, medicine, industry, academic research, and culture as an optical apparatus for obtaining a 3D shape and color information of an object. The 3D scanning apparatus is implemented in a variety of ways, e.g., a laser triangulation, a structured-light projection, and a time of flight (TOF), and stores obtained 3D shape information of the object in a 3D file format available on a computer system.

The 3D scanning technology acquires the shape information about the object and stores the shape information in a computer model, and demands for the 3D scanning technology keep steadily increasing on various fields, such as a robot navigation, a component defect inspection, a reverse engineering, a human computer interaction (HCI), and a cultural heritage restoration.

A conventional 3D scanning technology performs the 3D scanning of a subject through image combination by photographing the subject, which is to be taken, at different exposure levels and combining the photographed images.

DETAILED DESCRIPTION OF THE INVENTION

Technical Problem

Embodiments of the inventive concepts provide a 3D scanning apparatus and a 3D scanning method, which are capable of scanning a subject, that is photographed, in 3D based on depth values from codes that is substantially such as patterns projected onto the subject.

In detail, embodiments of the inventive concepts provide the scanning apparatus and the 3D scanning method, which are capable of scanning the subject in 3D by photographing a plurality of patterns projected onto the subject at different exposure levels and calculating a depth value of each pixel of the subject photographed using the patterns photographed at different exposure levels.

Technical Solution

One aspect of embodiments of the inventive concept is directed to provide a 3D scanning apparatus including a projector projecting a plurality of patterns previously set onto a subject that is to be 3D scanned, a photographing unit photographing each of the patterns projected onto the subject at each of exposure levels previously set, a calculating unit calculating a depth value for each pixel of the subject based on the patterns photographed at each of the exposure levels, and a scanning unit 3D scanning the subject, which is photographed, based on the calculated depth value.

The calculating unit calculates the depth value for each pixel of the subject by calculating the depth value for each pixel of the subject at each of the exposure levels and combining the depth values for the pixel, which are calculated at each of the exposure levels.

The calculating unit may determine a calculation area for each of the exposure levels based on the patterns photographed at each of the exposure levels and combines the depth values with respect to the pixel calculated in each determined calculation area to calculate the depth value for each pixel of the subject.

The photographing unit may photograph each of the patterns at each of the exposure levels using a single camera that controls an exposure level to each of the exposure levels or may photograph each of the patterns using plural cameras fixed at respective exposure levels.

The photographing unit photographs each of the patterns at each of the exposure levels in synchronization with a time point at which each of the patterns is projected.

Another aspect of embodiments of the inventive concept is directed to provide a 3D scanning method including projecting a plurality of patterns previously set onto a subject that is to be 3D scanned, photographing each of the patterns projected onto the subject at each of exposure levels previously set, calculating a depth value for each pixel of the subject based on the patterns photographed at each of the exposure levels, and 3D scanning the subject, which is photographed, based on the calculated depth value.

The calculating of the depth value includes calculating the depth value for each pixel of the subject by calculating the depth value for each pixel of the subject at each of the exposure levels and combining the depth values for the pixel, which are calculated at each of the exposure levels.

The calculating of the depth value includes determining a calculation area for each of the exposure levels based on the patterns photographed at each of the exposure levels and combining the depth values with respect to the pixel calculated in each determined calculation area to calculate the depth value for each pixel of the subject.

The photographing includes photographing each of the patterns at each of the exposure levels using a single camera that controls an exposure level to each of the exposure levels or photographing each of the patterns using plural cameras fixed at respective exposure levels.

The photographing includes photographing each of the patterns at each of the exposure levels in synchronization with a time point at which each of the patterns is projected.

Another aspect of embodiments of the inventive concept is directed to provide a 3D scanning apparatus including a projector projecting a plurality of patterns previously set onto a subject, which is to be 3D scanned, at different light intensities previously set, a photographing unit photographing each of the patterns projected onto the subject at an exposure level previously set, a calculating unit calculating a depth value for each pixel of the subject based on the photographed patterns, and a scanning unit 3D scanning the subject, which is photographed, based on the calculated depth value.

Advantageous Effects of the Invention

According to the embodiments of the present inventive concept, the subject may be 3D scanned by photographing the patterns projected onto the subject at different exposure levels from each other and calculating the depth value for each pixel of the subject using the patterns photographed at the different exposure levels.

When assuming that a bright area and a dark area exist in the subject that is photographed, the bright area becomes white due to saturation of pixel values caused by overexposure when increasing the exposure level, and thus it is difficult to recognize the bright area. When the exposure level decreases, the dark area becomes black due to the occurrence of an under exposure, and thus it is difficult to recognize the dark area.

According to the embodiments of the present inventive concept, since the patterns projected onto the subject are photographed at the exposure levels, the depth value with respect to the bright area of the subject that is photographed may be calculated using the image data with respect to the patterns photographed at low exposure levels, and the depth value with respect to the dark area of the subject that is photographed may be calculated using the image data with respect to the patterns photographed at high exposure levels. Accordingly, all the pixels of the subject that is photographed may be 3D scanned by calculating the depth values for all the bright and dark areas of the subject photographed.

BEST MODE

Hereinafter, embodiments according to the present inventive concept will be described in detail with reference to accompanying drawings. Although limited embodiments will be described below, these embodiments are merely examples of the present inventive concept, and those skilled in the art may easily change these embodiments.

Embodiments of the present inventive concept calculates a depth value for each pixel of a subject, which is photographed, based on a plurality of patterns photographed at each exposure level of a plurality of exposure levels and performs a 3D scanning operation on the subject based on the calculated depth value.

In this case, at least one camera that photographs the subject may photograph the patterns projected onto the subject, for example, the patterns projected 36 times per second, by a projector, and the patterns may be photographed at each of the exposure levels different from each other.

In the present inventive concept, calculating the depth value for each pixel may include the concept of calculating 3D coordinates for each pixel.

The apparatus and method according to embodiments of the present inventive concept will be described in detail with reference to FIGS. 1 to 7.

Figure 1:
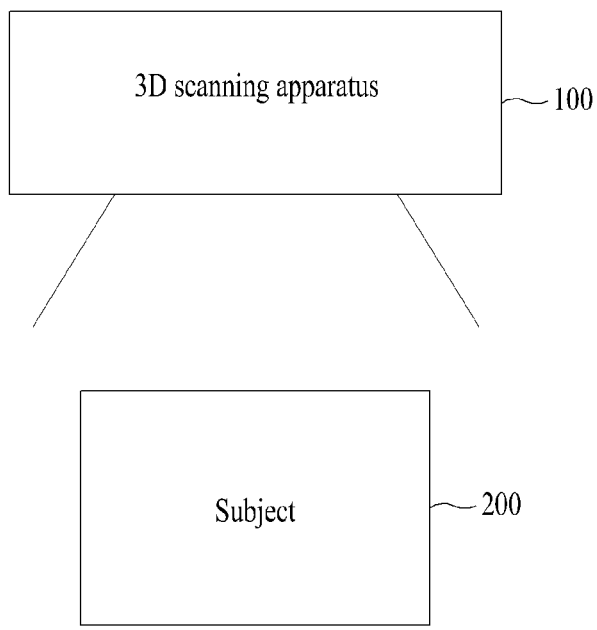
FIG. 1 is a view illustrating an apparatus according to a present inventive concept.
Figure 2:
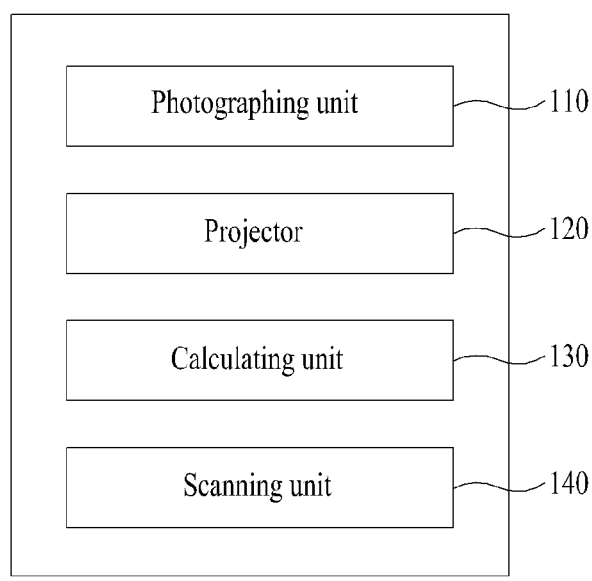
FIG. 2 is a view illustrating a configuration of a 3D scanning apparatus according to an embodiment of the present inventive concept.

FIG. 1 is a view illustrating an apparatus according to a present inventive concept, and FIG. 2 is a view illustrating a configuration of a 3D scanning apparatus according to an embodiment of the present inventive concept.

Referring to FIGS. 1 and 2, the 3D scanning apparatus 100 according to the embodiment of the present inventive concept is an apparatus for 3D scanning the subject and includes a photographing unit 110, a projector 120, a calculating unit 130, and a scanning unit 140.

The projector 120 projects the patterns, which are predetermined and have a predetermined form, onto a subject 200 that is to be scanned.

In the present exemplary embodiment, the projector 120 may project lights having predetermined different patterns, e.g., lights having 36 different patterns, onto the subject 200 during a predetermined period, e.g., about 1 second, by a control unit, for example, an MCU of the apparatus. The number of the lights and the patterns, which are projected onto the subject 200 by the projector 120, may be determined by a provider who provides the present inventive concept.

The patterns projected onto the subject 200 by the projector 120 may have various stripe patterns having different widths in a horizontal direction as an example shown in FIG. 5A, may have various stripe patterns having different widths in a vertical direction as an example shown in FIG. 5B, or may have a lattice pattern or a checkerboard pattern as an example shown in FIG. 5C. The patterns projected by the projector 120 should not be limited to the patterns shown in FIGS. 5A to 5C, and the patterns may have various patterns applicable, such as a cross pattern or an X-pattern.

The projector 120 may be located at a position such that the projector 120 may project the patterns vertically onto the subject 120. The projector 120 may be located at a position rather than the position perpendicular to a position of the subject 120. In this case, since a distortion occurs in the patterns projected onto the subject due to the positions of the projector 120 and the subject 200, the distortion should be considered in calculating the depth value for each pixel of the subject that is to be photographed.

In addition, the projector 120 projects the patterns in synchronization with a photographing time point of the photographing unit 110, and a projecting time point and a photographing time point may be controlled by the control unit of the apparatus.

The photographing unit 110 serves as a component that photographs each of the patterns projected onto the subject. The photographing unit 110 photographs each of the patterns projected onto the subject based on the time point, at which each of the patterns is projected onto the subject, at the predetermined exposure levels by the control of the control unit of the apparatus.

That is, the photographing unit 110 photographs the patterns projected onto the subject that is to be 3D scanned at each of the exposure levels to calculate the depth value for each pixel of the subject that is photographed. Image data with respect to each pattern photographed at each exposure level are provided to the calculating unit 130.

Since the photographing unit 110 of the present inventive concept photographs the patterns at each exposure level, although an error occurs in a portion of a photographed area of each pattern photographed at a first exposure level or the portion of the photographed area of each pattern photographed at the first exposure level is not recognized, these errors may be compensated by the image data of each pattern photographed at another exposure level. Accordingly, the image data that allow the depth values to be calculate with respect to all the pixels of the subject may be obtained.

In this case, the photographing unit 110 may photograph each pattern projected onto the subject at each exposure level using a single camera that may control the exposure level or may photograph the patterns using plural cameras fixed at respective exposure levels. In the case where the patterns are photographed at each exposure level using the single camera, the patterns are sequentially photographed at the first exposure level, the patterns are sequentially photographed at a second exposure level after adjusting the first exposure level to the second exposure level, and the patterns are sequentially photographed at a third exposure level after adjusting the second exposure level to the third exposure level. The exposure level at which the photographing unit 110 photographs the patterns in the present inventive concept may include a high exposure level, an intermediate exposure level, and a low exposure level that are predetermined, each exposure level may be determined by the provider who provides the technology of the present inventive concept, and each exposure level may be varied depending on a surrounding environment and the subject to be scanned.

Figure 3:
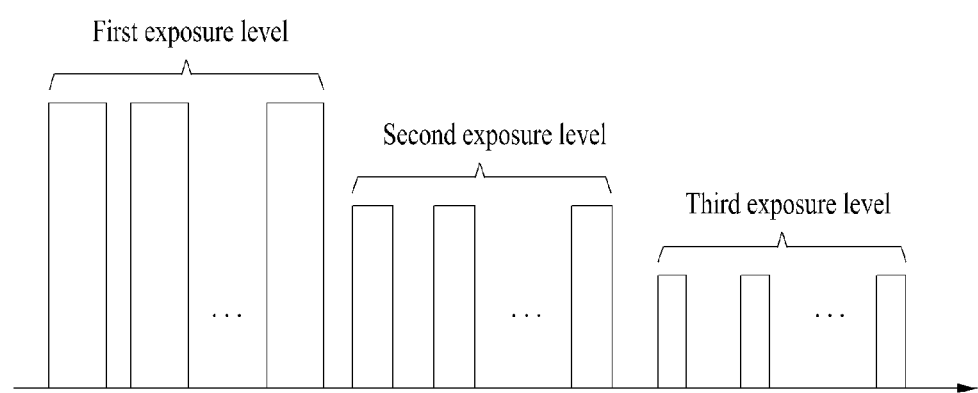
FIG. 3 is a view illustrating a method of photographing a plurality of patterns by adjusting an exposure level in one camera.

As an example, in the case where the photographing unit 110 uses the single camera that may control the exposure level, as shown in FIG. 3, the photographing unit 110 photographs the patterns sequentially projected onto the subject at the projecting time point in a state in which the exposure level is set to the first exposure level, e.g., the high exposure level, photographs the patterns sequentially projected onto the subject at the projecting time point in a state in which the exposure level is set to the second exposure level, e.g., the intermediate exposure level, and photographs the patterns sequentially projected onto the subject at the projecting time point in a state in which the exposure level is set to the third exposure level, e.g., the low exposure level. Thus, the image data with respect to the patterns at the first exposure level, the image data with respect to the patterns at the second exposure level, and the image data with respect to the patterns at the third exposure level may be obtained. In the embodiment shown in FIG. 3, since the patterns are photographed while sequentially changing the exposure level, a photographing time may be longer compared with that when the patterns are photographed by plural cameras.

Figure 4:
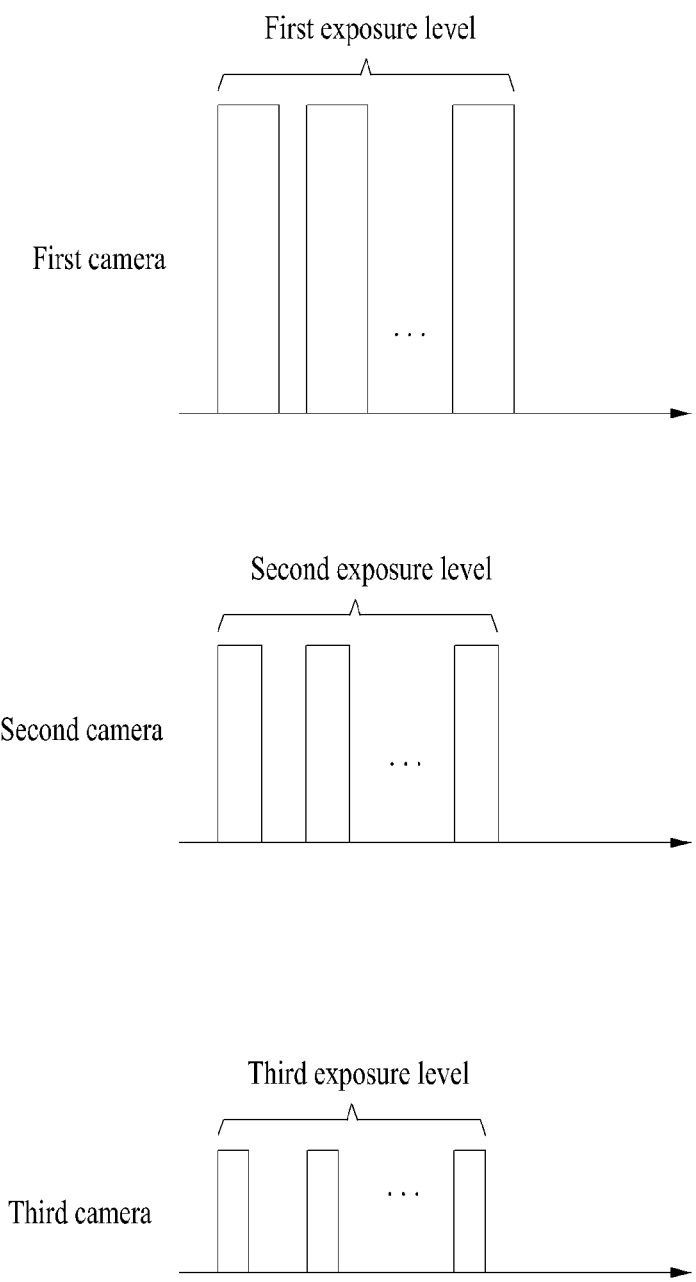
FIG. 4 is a view illustrating a method of photographing the plurality of patterns by adjusting the exposure level in three cameras.
Figure 5:
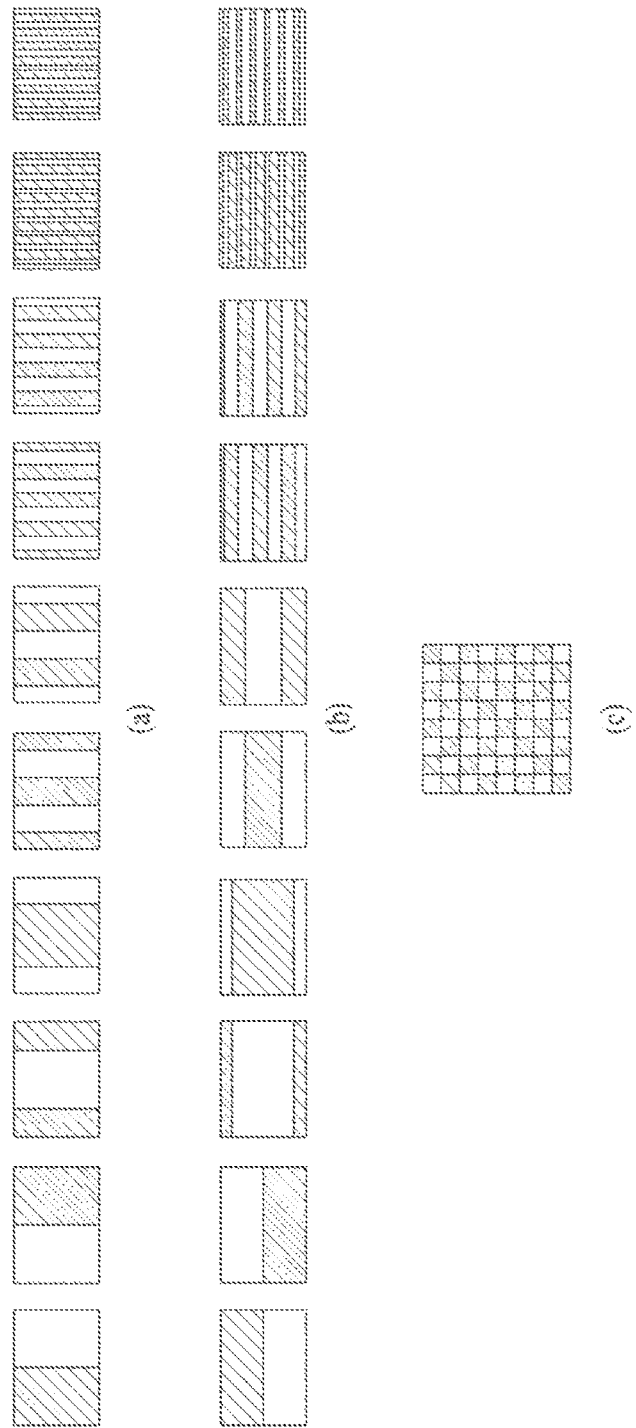
FIG. 5 is a view illustrating patterns projected onto a subject.

As another example, in the case where the photographing unit 110 uses three cameras having different exposure levels, as shown in FIG. 4, a first camera fixed to the first exposure level, a second camera fixed to the second exposure level, and a third camera fixed to the third exposure level substantially simultaneously photograph the patterns sequentially projected onto the subject at the projecting time point, and thus the image data with respect to the patterns at the first exposure level, the image data with respect to the patterns at the second exposure level, and the image data with respect to the patterns at the third exposure level may be obtained at a time.

Further, in a case where the photographing unit 110 includes an ambient environment sensor, the photographing unit 110 may sense an ambient brightness, may determine at least one exposure level corresponding to the sensed ambient brightness among the exposure levels, and may photograph the patterns projected onto the subject at the determined at least one exposure level. For example, when the ambient brightness is dark, the patterns projected onto the subject may be photographed only at the high and intermediate exposure levels, and when the ambient brightness is very bright, the patterns projected onto the subject may be photographed only at the intermediate and low exposure levels.

The calculating unit 130 calculates the depth value for each pixel of the subject based on the image data with respect to each pattern photographed at each exposure level.

In this case, the calculating unit 130 may estimate and calculate the depth value for each pixel of the subject based on the patterns projected by the projector 120 and the patterns photographed at each exposure level.

The calculating unit 130 calculates the depth value for each pixel of the subject by calculating the depth value for each pixel of the subject at each exposure level and combining the depth values for the pixels, which are calculated at each exposure levels.

In detail, the calculating unit 130 may determine a calculation area for calculating the depth value for each pixel of the subject from the image data with respect to the patterns photographed at each exposure level, calculates the depth values with respect to pixel values in the calculation area determined at each exposure level, and combines the depth values, thereby calculating the depth value for each pixel of the subject.

In this case, since there may exist areas that are unrecognizable in the image data with respect to the patterns photographed at each exposure level, the depth values for the pixels in all the areas of the subject may be calculated by calculating the depth values only with respect to recognizable areas at each exposure level and combining the depth values with respect to all the exposure levels.

Furthermore, different depth values may be acquired with respect to the same pixel when the depth values of the pixel, which are calculated at each exposure level, are combined or summed with each other, and in this case, the calculating unit 130 may determine the depth value of a corresponding pixel by taking into account whether a saturation exposure occurs at the low exposure level or an under exposure occurs at the high exposure level using each exposure level and the photographed image data. The above-described descriptions are an example of the method for determining the depth values with respect to the corresponding pixel. The method for determining one depth value among the depth values with respect to the corresponding pixel in the present inventive concept should not be limited thereto or thereby, and all available methods may be used to determine the depth values.

In the present inventive concept, calculating the depth values for the pixels of all areas of the subject by the calculating unit 130 may include the concept of calculating 3D coordinates for the pixels in all areas of the subject.

The scanning unit 140 3D scans the subject photographed by the photographing unit 110 based on the depth value of each pixel, which is calculated by the calculating unit 130.

In detail, the scanning unit 140 corrects the depth value of each pixel of the subject photographed by the photographing unit based on the depth value of each pixel calculated by the calculating unit 130, and thus the subject is 3D scanned.

As described above, the 3D scanning apparatus according to the exemplary embodiment of the present inventive concept photographs the patterns projected onto the subject at each exposure level and calculates the depth value for each pixel of the subject, that is photographed, based on the image data with respect to the patterns photographed at each exposure level. Accordingly, the 3D scanning apparatus may 3D scan the subject, that is photographed, using the calculated depth value of each pixel. The scanned 3D data may be stored in a storage unit included the apparatus or separately provided.

In addition, since the 3D scanning apparatus according to the exemplary embodiment of the present inventive concept photographs the patterns projected onto the subject at the exposure levels, the depth value for the bright areas of the subject, which is photographed, may be calculated by using the image data with respect to the patterns photographed at the low exposure level, and the depth value for the dark areas of the subject, which is photographed, may be calculated by using the image data with respect to the patterns photographed at the high exposure level. Accordingly, all the pixels of the subject, which is photographed, may be 3D scanned by calculating the depth values with respect to all the bright and dark areas of the subject, which is photographed.

Further, the 3D scanning apparatus according to another exemplary embodiment of the present inventive concept may project the patterns onto the subject while changing an intensity of the light for the patterns projected by the projector without changing the exposure of the camera. Therefore, the 3D scanning apparatus according to another exemplary embodiment of the present inventive concept may calculate the depth value for each pixel of the subject, which is photographed, based on the patterns photographed at the same exposure state but having different intensities and may 3D scan the subject based on the calculated depth value.

That is, the projector projects the patterns having the predetermined form at different light intensities onto the subject.

In this case, the projector may project each of the patterns at different light intensities, or the projector may project the patterns while controlling the light intensity in such a manner that the patterns are projected at a first light intensity and then the patterns are projected at a second light intensity.

The photographing unit photographs each of the patterns, which are projected onto the subject at different light intensities, at the predetermined exposure level.

The calculating unit estimates and calculates the depth value for each pixel of the subject based on the patterns projected by the projector and having different light intensities and the patterns photographed by the photographing unit.

The scanning unit 140 3D scans the subject photographed by the photographing unit based on the depth value for each pixel, which is calculated by the calculating unit.

Figure 6:
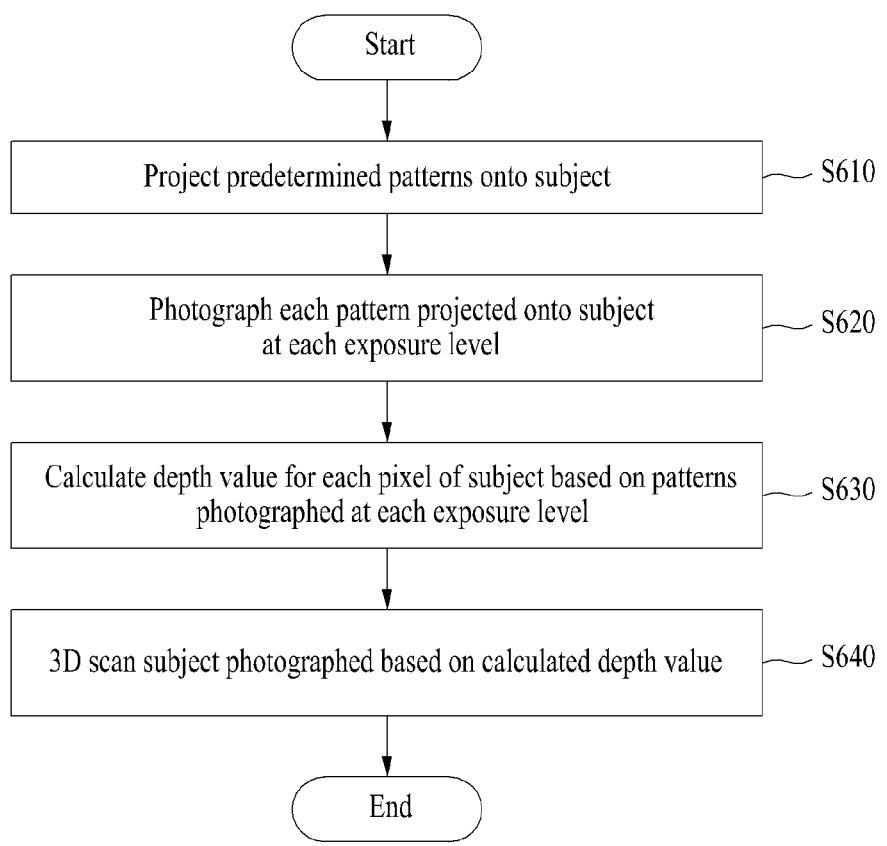
FIG. 6 is a flow chart illustrating a 3D scanning method according to an embodiment of the present inventive concept.

FIG. 6 is a flow chart showing a 3D scanning method according to an embodiment of the present inventive concept. In detail, FIG. 6 shows operations of the 3D scanning apparatus shown in FIGS. 1 to 5.

Referring to FIG. 6, the 3D scanning method according to the embodiment of the present inventive concept projects the predetermined patterns onto the subject that is to be scanned and photographs each pattern projected onto the subject at each exposure level previously set (S610 and S620).

In this case, the projecting time point of each pattern projected onto the subject may be synchronized with the photographing time point of each pattern, the patterns projected onto the subject may be photographed using the single camera that may adjust the exposure level such that each pattern projected onto the subject is photographed at each exposure level, and the patterns may be photographed using the plural cameras respectively fixed to the exposure levels.

When the image data of each pattern projected onto the subject at each exposure level are obtained in operation S620, the depth value for each pixel of the subject is calculated based on the image data of each pattern projected onto the subject and photographed at each exposure level (S630).

In this case, in operation S630, the depth value for each pixel of the subject is calculated by calculating the depth value for each pixel of the subject based on the image data with respect to each pattern at each exposure level and combining the depth values for each pixel calculated at each of the exposure levels.

Figure 7:
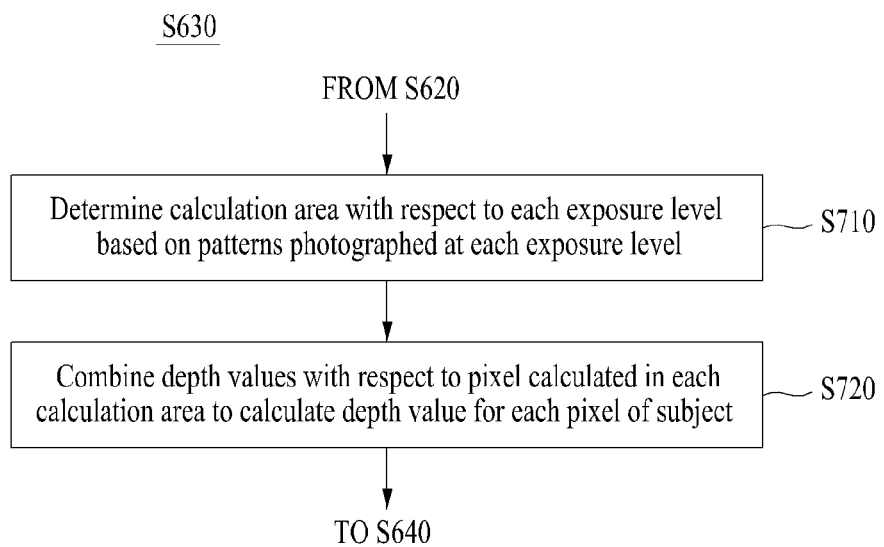
FIG. 7 is a flow chart illustrating an operation S620 of FIG. 6.

In addition, as shown in FIG. 7, the calculating in operation S630 includes determining the calculation area for each exposure level based on the patterns photographed at each exposure level and combining the depth values with respect to the pixels calculated in each of the determined calculation areas, thereby calculating the depth value for each pixel of the subject (S710 and S720).

In this case, the calculating of the depth value for each pixel of the subject in operations S630 or S720 may include the concept of calculating 3D coordinates for each pixel.

When the depth value for each pixel of the subject is calculated in operation S630, the subject, which is photographed, is 3D scanned based on the calculated depth value of each pixel (S640).

The 3D scanning method according to the embodiment of the present inventive concept may include all operations of the 3D scanning apparatus described with reference to FIGS. 1 to 5.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit is illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

INDUSTRIAL APPLICABILITY

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments and within the scope of the claims to be described later things by the claims and equivalents.

The invention claimed is:

1. A 3D scanning apparatus comprising:
a projector projecting a plurality of patterns previously set onto a subject that is to be 3D scanned;
a photographing unit photographing each of the patterns projected onto the subject at each of exposure levels previously set;
a calculating unit calculating a depth value for each pixel of the subject based on the patterns photographed at each of the exposure levels; and
a scanning unit 3D scanning the subject, which is photographed, based on the calculated depth value;
wherein the calculating unit calculates the depth value for each pixel of the subject by calculating the depth value for each pixel of the subject at each of the exposure levels and combining the depth values for the pixel, which are calculated at each of the exposure levels.

2. The 3D scanning apparatus of claim 1, wherein the calculating unit determines a calculation area for each of the exposure levels based on the patterns photographed at each of the exposure levels and combines the depth values with respect to the pixel calculated in each determined calculation area to calculate the depth value for each pixel of the subject.

3. The 3D scanning apparatus of claim 1, wherein the photographing unit photographs each of the patterns at each of the exposure levels using a single camera that controls an exposure level to each of the exposure levels or photographs each of the patterns using plural cameras fixed at respective exposure levels.

4. The 3D scanning apparatus of claim 1, wherein the photographing unit photographs each of the patterns at each of the exposure levels in synchronization with a time point at which each of the patterns is projected.

5. A 3D scanning method comprising:
projecting a plurality of patterns previously set onto a subject that is to be 3D scanned;
photographing each of the patterns projected onto the subject at each of exposure levels previously set;
calculating a depth value for each pixel of the subject based on the patterns photographed at each of the exposure levels; and
3D scanning the subject, which is photographed, based on the calculated depth value;
wherein the calculating of the depth value comprises calculating the depth value for each pixel of the subject by calculating the depth value for each pixel of the subject at each of the exposure levels and combining the depth values for the pixel, which are calculated at each of the exposure levels.

6. The method of claim 5, wherein the calculating of the depth value comprises determining a calculation area for each of the exposure levels based on the patterns photographed at each of the exposure levels and combining the depth values with respect to the pixel calculated in each determined calculation area to calculate the depth value for each pixel of the subject.

7. The method of claim 5, wherein the photographing comprises photographing each of the patterns at each of the exposure levels using a single camera that controls an exposure level to each of the exposure levels or photographing each of the patterns using plural cameras fixed at respective exposure levels.

8. The method of claim 5, wherein the photographing comprises photographing each of the patterns at each of the exposure levels in synchronization with a time point at which each of the patterns is projected.

* * * * *